E. M. HEYLMAN.
ENGINE GANG PLOW.
APPLICATION FILED NOV. 18, 1915.
1,200,107.
Patented Oct. 3, 1916.
2 SHEETS—SHEET 1.
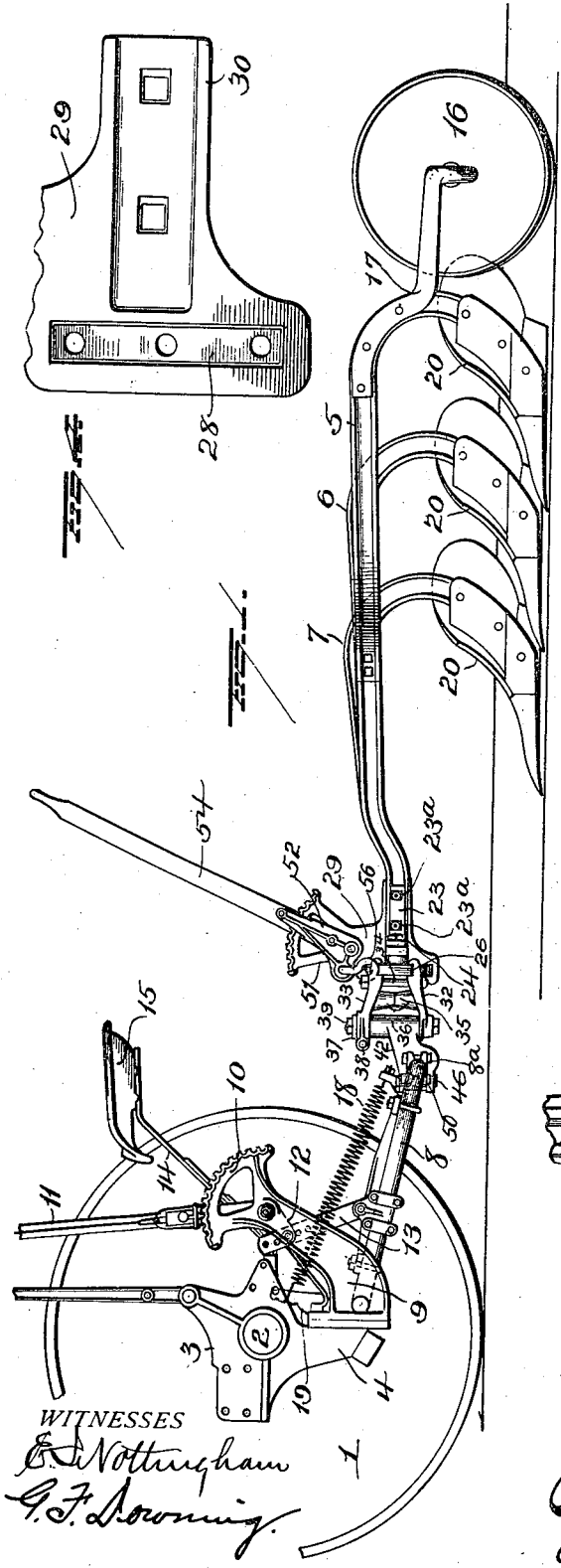
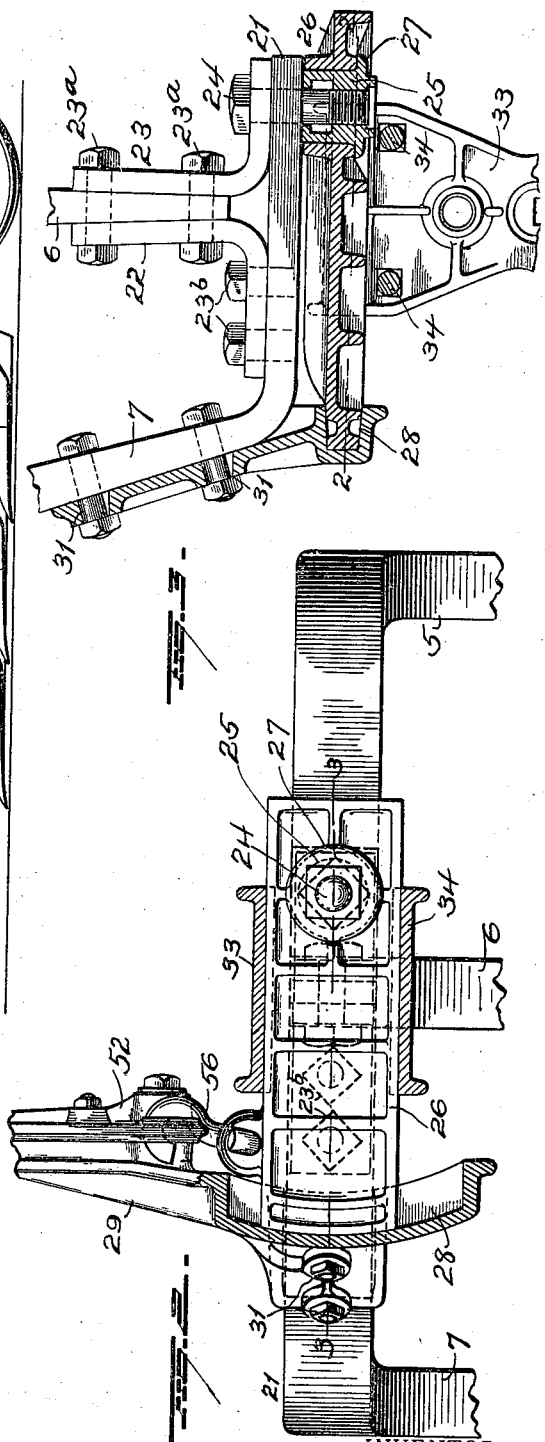
WITNESSES
INVENTOR

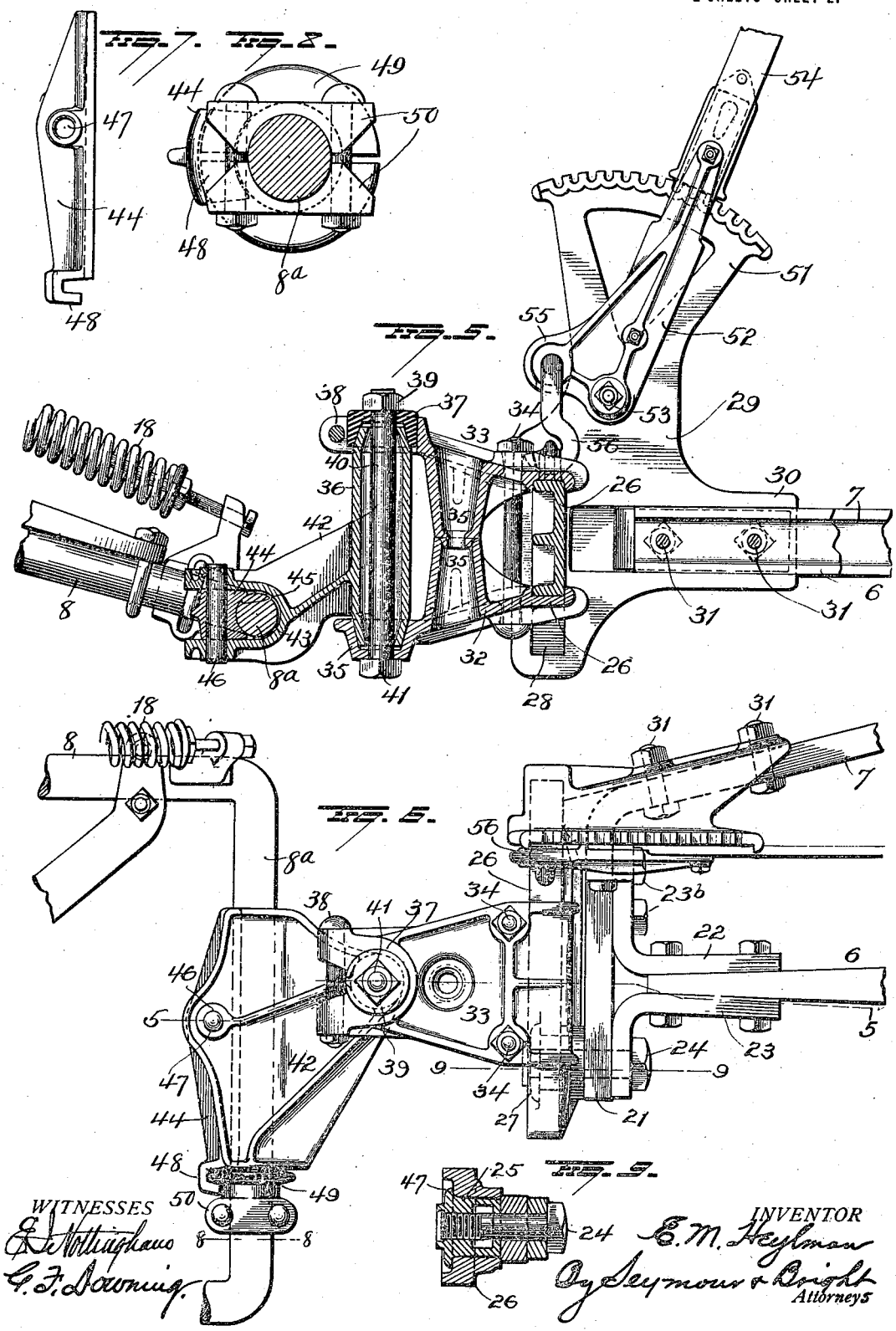

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,200,107.      Specification of Letters Patent.      Patented Oct. 3, 1916.

Application filed November 18, 1915. Serial No. 62,177.

*To all whom it may concern:*

Be it known that I, EDWARD M. HEYLMAN, a citizen of the United States and a resident of South Bend, in the, county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in engine gang plows and particularly to that type disclosed in Letters-Patent No. 1,148,088 granted to me on the 27th day of July, 1915.

One object of my present invention is to provide simple and efficient means for leveling the plow-gang and for adjusting the same in such manner that the front plow will not run as deep as the rear plow in opening-up a land, so as to prevent making a high back furrow.

A further object is to provide, in an engine gang plow of the type specified, means which will operate to reduce strain on the plow bodies when any of the same shall come into contact with an immovable obstruction, such as a stone or stump, and thus prevent possibility of breaking the shares or bending the beams.

With these and other objects in view, the invention consists in certain novel features of construction and arrangements of parts as hereinafter set forth and pointed out in the claims.

In the accompanying drawings; Figure 1 is a side elevation of an engine gang plow structure embodying my improvements; Fig. 2 is a sectional view, partly in elevation, on the line 2—2 of Fig. 3; Fig. 3 is a sectional view partly in elevation, on the line 3—3 of Fig. 2; Fig. 4 is an enlarged detail view of a portion of the segment bracket 29; Fig. 5 is a sectional view on the line 5—5 of Fig. 6; Fig. 6 is a plan view showing the connection between the bail and beams of the plow-gang; Fig. 7 is a detail view of the spacer bar 44; Fig. 8 is a section on the line 8—8 of Fig. 6, and Fig 9 is a section on the line 9—9 of Fig. 6.

A traction engine is illustrated diagrammatically at 1 and the rear axle 2 of the tractor may be mounted in a suitable bearing bracket 3 having a flange 4 to be secured to a fixed part of the tractor structure,— said bracket or casting thus constituting a part of the tractor.

A gang of rigidly connected plows 5, 6, 7, is connected, (through the medium of coupling and adjusting devices hereinafter explained) with the rear end of a trailing bail or draft device 8,—the forward end of the latter being pivotally connected with the bracket or bearing casting 3. An arm 9 is secured to the bracket 3 at a point below the axle 2 (as disclosed in my patent hereinbefore referred to) and projects upwardly and rearwardly. The upper end of this arm is provided with a toothed segment 10, and to said arm, a hand lever 11 is pivoted and provided with a suitable detent to engage the toothed segment. The lever 11 is provided below its pivotal support with a forwardly projecting arm 12, with which a link 13 is adjustably connected, the lower end of said link being connected with the bail or draft device 8. A seat spring 14 is secured to the bracket 3 of the tractor and carries a seat 15 located approximately over the rear end of the bail so that an operator thereon may conveniently manipulate the lever 11 for raising or lowering the bail, to tip the forward end of the plow gang vertically to adjust the plow bases for depth of plowing or to raise them out of the ground. The vertical tipping of the plow gang will be facilitated by a rolling fulcrum at the rear end thereof,—said rolling fulcrum being afforded by a wheel 16 mounted in a bracket 17 secured to and projecting rearwardly from the rearmost plow beam 7, and a balancing spring 18 may be attached to the rear portion of the bail and adjustably connected with an arm 19 on the tractor,—all as explained in my former patent.

The plow gang may comprise two or more beams (three such beams being shown in the drawings), rigidly connected together and provided with suitable plow bodies 20. The forward end of the beam of plow 7 may be bent laterally to form a horizontal bar 21 and the beam of plow 6 connected to this cross bar by means of angle braces 22—23 bolted as at 23ª, 23ᵇ and 24. The beam of plow 5 (when three plows are employed) may be secured to the beam of plow 6 as shown in my former patent. The bolt 24 which consists in securing the angle brace 23 to the beam cross bar 21, projects forwardly beyond the latter and is threaded to receive a nut 25 (which is round in transverse section), on which a transversely disposed cross or clevis bar 26 is pivotally mounted near one of its ends, as clearly shown in Fig. 3. The pivot nut 25 may bear at one end against the beam cross bar 21 and may be provided at its other end with an annular flange 27.

The free end of the clevis cross bar 26 is movable vertically (in an arc concentric to the pivot of said bar) in a vertical groove 28 forming in a bracket 29,—the latter being made with a rearwardly projecting recessed arm 30 which receives the forward portion of the beam of plow 7 and to which said bracket arm is rigidly secured by means of bolts 31.

Two clamping arms 32—33 engage the cross clevis and are recessed at their rear ends to receive the upper and lower edges of said bar. The arms 32—33 are securely clamped to the bar 26 by means of bolts 34 and are maintained properly spaced apart by means of intermeshing lugs 35 which may, if desired, be made hollow, as shown in Fig. 5. The forward end of the lower arm 32 is made with a horizontal conical bearing 35 for the lower conical end of a pivot post 36 and the upper arm 33 is bifurcated at its forward end for the reception of a bearing block 37 for the upper conical end of the pivot post,—said bearing block being held adjustably in place by means of a clamping bolt 38 and by a nut 39 on the upper end of a bolt 40, which latter passes through the pivot post and both bearings and is provided at its lower end with a head 41.

An elongated coupling arm 42 is made rigid with the pivot post 36 and projects forwardly and laterally therefrom. The forward portion of the coupling arm 42 is bifurcated to form a horizontal elongated recess 43 which receives the rear cross bar 8ª of the bail 8. The recess 43 is of such depth that the upper and lower portions of the coupling arm will project forwardly beyond the cross bar of the bail and between these forwardly projecting portions, an elongated filler block 44 is disposed. This filler block is made with a curved rear face 45 which rests against the cross bar of the bail. The filler block is secured in position in the bifurcated portion of the coupling arm and the pivotal mounting of the latter on the bail is completed, by means of a break pin 46 which passes through holes in the bifurcated forward end of the coupling arm and through a suitable hole 47 in the filler block 44. The break pin is preferably so located that it will be disposed laterally from a line passing centrally through the arms 32—33 and the pivot post carried by these arms, as clearly shown in Fig. 6.

One end of the filler block 44 is made with a curved lip 48 which engages a flanged collar 49 secured to the cross bar 8ª of the bail 8, by means of a clamp 50. The collar 49 is thus adjustably connected with the bail and, by its connection with the filler, permits the connection of the coupling arms to the cross bar of the bail to be adjusted on the latter and the plow gang to be adjusted laterally.

The bracket 29 at the forward end of the plow gang frame is made with a toothed segment 51 and to said bracket, an L-shaped lever arm 52 is pivotally connected at 53. A hand lever 54 is secured to the lever arm 52 and carries a suitable detent to engage the segment 51,—the lever 54 being thus located within convenient reach of an operator on the seat 15. The short member 55 of the lever arm 52 is connected by means of a link 56, with the clevis cross bar 26 near the free end of the latter.

From the construction and arrangement of parts above described, it will be seen that the operator may, from his position on the seat 15, manipulate the lever 54 to tilt the horizontal clevis cross bar 26 on its pivotal support, thus raising or lowering said bar and consequently leveling the plows of the gang crossing to the line of travel. The construction is also such that by manipulating the lever 54, one side of the gang frame may be raised higher than the other side, and thus the forward plow of the gang may be caused to make a more shallow furrow than will be made by the rear plow. This is important in opening up a land as it will avoid the making of a high back furrow.

By providing a break pin in the connection of the coupling devices with the bail,— the plows of the gang will be effectually protected against undue strain, breaking or bending, should any of the plow bases encounter an immovable obstruction. Should such an obstruction be met the wooden pin 46 will break and thus the plow gang will be freed from the tractor. After again coupling the gang with the draft devices, the operator may back the plows sufficiently to free the obstruction and then, after raising the gang by operation of the lever 11, the operator may run the plow structure forwardly until the obstruction shall have been passed,—after which he will move the plows to working position by manipulation of the lever 11.

Various slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a gang plow structure, the combination with a tractor, a plow gang frame, draft means, and connecting devices between the plow gang frame and said draft means, said connecting means including a transversely disposed pivoted bar, and a manually operable lever connected with said bar for tilting the plow gang frame transversely to level the plows of the gang or to raise the front plow higher than the rear plow.

2. In a gang plow structure, the combination with a tractor, a plow gang frame, and a draft device, of a lever mounted on the plow gang frame, a clevis bar pivotally connected with the plow gang frame and connected with said lever, and connecting devices between said clevis bar and the draft device.

3. In a gang plow structure, the combination with a tractor, and a plow gang frame, of a bracket secured to the plow gang frame and having a vertically disposed groove, a clevis bar pivotally connected near one end to the plow gang frame and movable at its other end in said vertical groove, a lever mounted on said bracket, a connection between said lever and the clevis bar, means for locking the lever, and connecting devices between said clevis bar and the tractor.

4. In a gang plow structure, the combination with a tractor and draft devices connected therewith, of a plow gang frame having a horizontal pivot connection with said draft devices, a manually operable lever mounted on the plow gang frame and connected with the draft devices, whereby said plow gang frame may be tilted transversely, and means for locking said lever.

5. In a gang plow structure, the combination with a tractor, a plow gang frame, and a draft base pivotally connected with the tractor, of a clevis bar having pivotal connection near one end with the plow gang frame and having movable connection at the other end with said frame, a manually operable lever mounted on said plow gang frame and connected with said clevis bar, means for locking said lever and coupling devices between said clevis bar and bail, said coupling devices including members having vertical pivot connection with each other, one of said members having rigid connection with the clevis bar and the other of said members being pivotally mounted on the draft bail.

6. In a gang plow structure, the combination with a tractor, a draft bail, and a plow gang frame, of coupling devices connected with the plow gang frame, and a break pin connecting said coupling devices with the cross bar of the draft bail.

7. In a gang plow structure, the combination with a tractor, a draft bail and plow gang frame, of coupling devices between the plow gang frame and said bail, said coupling devices comprising a recessed member receiving the cross bar of the draft bail, a filler block disposed in said recessed member, and a break pin passing through the overhanging portions of said member and through said filler block.

8. In a gang plow structure, the combination with a tractor, a draft bail, and a plow gang frame, of coupling devices between said plow gang frame and the bail, said coupling devices comprising a bifurcated member receiving the cross bar of the bail, a filler block disposed in said bifurcated member and engaging the cross bar of the bail, a break pin passing through the overhanging portions of the break member and said filler block, a collar adjustable on the cross bar of the bail, and a connection between said collar and said filler block.

9. In a gang plow structure, the combination with a tractor and a draft device, of a plow gang frame comprising a beam bent at its forward end to form a cross bar and a beam rigidly secured to said cross bar a bracket secured to the first mentioned beam and provided with a toothed segment, a clevis bar pivotally connected with said beam cross bar and engaging said bracket, a lever pivoted to said bracket and connected with said clevis bar, means for locking said lever to the toothed segment, and connections between the clevis bar and the draft device.

In testimony whereof, I have signed this specification in the presence of two subscribing witnesses.

EDWARD M. HEYLMAN.

Witnesses:
  EDWIN NICAR,
  KATE E. BUCKLEY.